UNITED STATES PATENT OFFICE.

JOSEPH KLEEMANN, OF MEISSEN, SAXONY, GERMANY.

IMPROVEMENT IN THE PREPARATION OF UMBRELLA-STICKS, &c., OF RATTAN.

Specification forming part of Letters Patent No. 13,850, dated November 27, 1855.

*To all whom it may concern:*

Be it known that I, JOSEPH KLEEMANN, of Uftrungen, in the Principality of Schwarzburg-Sondershausen, and resident of the city of Meissen, Kingdom of Saxony, Germany, have invented a new and Improved Mode of Preparing Rattan for Umbrella and Parasol Sticks, so as to give it the appearance and most of the peculiar properties of whalebone, of which the following is a specification.

The nature of my invention consists in impregnating rattan-cane cut into sticks of the desired shape with dye-stuffs and resinous substances, so as to make these substances penetrate into the interior cells and pores of the cane and fill them completely up, by which treatment the rattan acquires a high flexibility and elasticity more or less resembling genuine whalebone, and becomes applicable as a good substitute for the same, but superior to it, as its elasticity is not at all affected by changes of temperature nor by the moisture of the atmosphere.

In order to enable others skilled in the art to make use of my invention, I give hereby a full and exact description of the mode of proceeding.

Rattan sticks cut in the desired shape are tied up in bundles and soaked in logwood extract for about four days. After the extract has penetrated the sticks thoroughly they are immersed in a solution of any of the iron salts, sulphate, nitrate, or acetate of iron, which, combining with the logwood extract, gives the rattan a durable deep-black dye. If the color should not appear perfect, the soaking in logwood extract and in solution of the iron salts may be repeated till the right color is produced. After dyeing, the rattan is exposed in a close vessel to steam of three or four atmospheres' pressure for a short time—say one hour—in order to open the innermost cells and pores for the subsequent operations. The rattan is now to be dried most perfectly in a warm well-ventilated room, or by means of a centrifugal drying-machine, in order to expel the last traces of moisture from the inner cells and pores. The drying done, the sticks are soaked in linseed or other drying oil, which operation is best performed in a large drum, which is made to revolve rapidly around a shaft, so that by centrifugal power the oil is forced into the natural cells and pores of the rattan. The sticks, being well impregnated with the oil, are dried at a temperature of from 110° to 125° Fahrenheit till the oil has become hard. Then I put the sticks in an iron cylinder which is strong enough to stand the pressure of at least ten atmospheres, and which can be shut up perfectly air and steam tight. This cylinder is connected by pipes and stop-cocks with a powerful air-pump, a small strong force-pump, and with an open vessel containing a varnish made by dissolving one hundred and twenty parts of shellac and two hundred parts of Burgundy pitch in ninety parts of absolute alcohol. The cylinder being closed air-tight, I exhaust the air from it by means of the air-pump as much as possible. Then I shut up the stop-cock of the air-pump and open that of the vessel containing the varnish, which by the atmospheric pressure is forced rapidly into the cylinder and into the innermost airless pores and cells of the rattan sticks. In order to make this impregnation more perfect, I pump into the cylinder by means of the force-pump as much as posssible of the above-mentioned varnish, elevating the pressure to about ten atmospheres. In this way I obtain a most perfect filling up of the cells and pores with the varnish. The rattan sticks are now removed from the cylinder and spread out to dry in a warm room. Afterward they are reduced to any desired shape, ground, polished, or varnished, according to the option of the manufacturer and the demands of the public; and the so prepared rattan sticks may be used for all the purposes for which presently whalebone is applied.

Instead of the dye-stuffs mentioned above, others may be substituted; or they may be forced into the interior of the sticks by atmospheric, centrifugal, or other force, and I do not claim the exact prescription of the varnish given above.

I disclaim impregnating woods in general; but

I claim—

The preparation of rattan by impregnating it with drying-oils, dyes, and varnishes, substantially as described above, for the purpose of giving it flexibility, elasticity, tension, and an appearance similar to whalebone, the rattan so prepared to be used as a substitute for whalebone in the manufacture of umbrella and parasol frames, and for other purposes for which whalebone can be employed.

JOSEPH KLEEMANN. [L. S.]

Witnesses:
GUSTAVUS STOCKMANN,
F. A. MÜLLER.